Nov. 10, 1931.   M. L. MARTUS ET AL   1,831,460
PRIMARY BATTERY
Original Filed Dec. 21, 1926   2 Sheets-Sheet 1
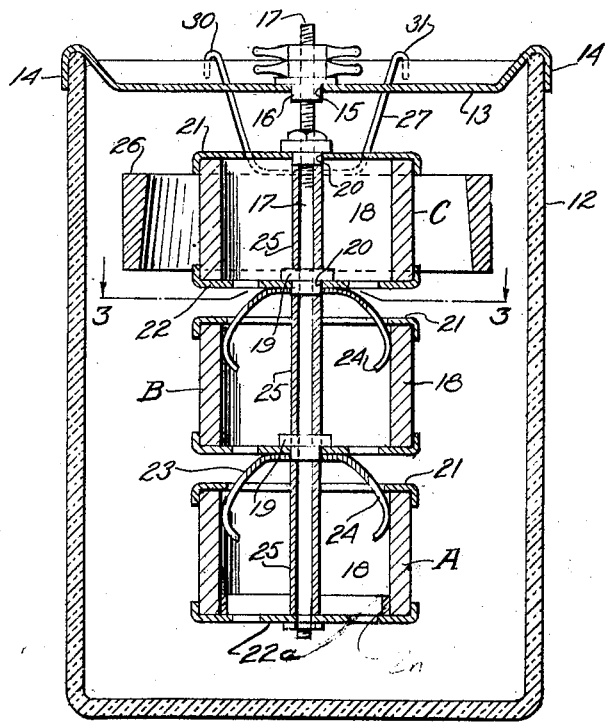
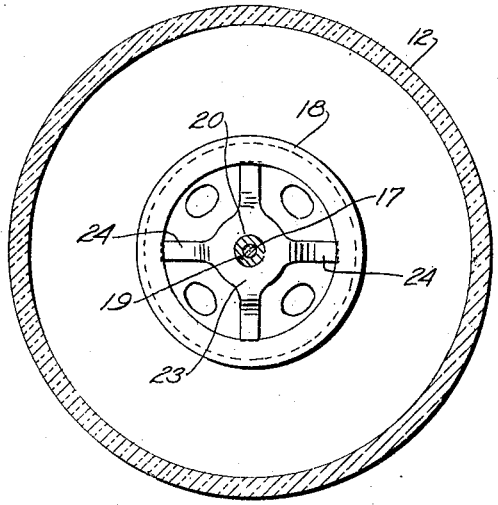
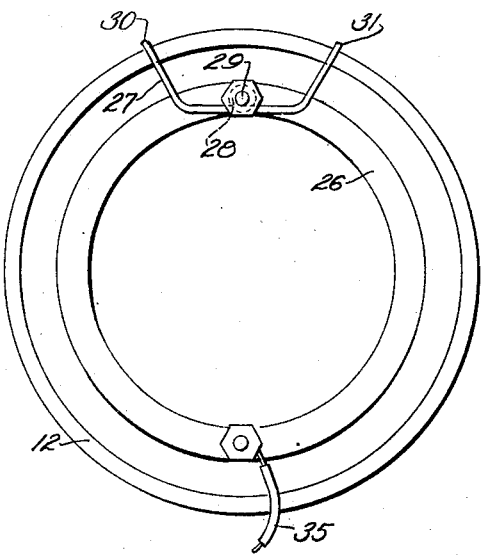
INVENTOR.
Martin L. Martus,
Edmund H. Becker and
BY James G. Ross.
Chamberlain & Newman
ATTORNEYS.

Nov. 10, 1931.    M. L. MARTUS ET AL    1,831,460
PRIMARY BATTERY
Original Filed Dec. 21, 1926    2 Sheets-Sheet 2

INVENTOR.
Martin L. Martus,
Edmund H. Becker, and
BY  James G. Ross.
Chamberlain + Newman
ATTORNEYS.

Patented Nov. 10, 1931

1,831,460

UNITED STATES PATENT OFFICE

MARTIN L. MARTUS, OF WOODBURY, AND EDMUND H. BECKER AND JAMES G. ROSS, OF WATERBURY, CONNECTICUT

PRIMARY BATTERY

Original application filed December 21, 1926, Serial No. 156,100, Patent No. 1,725,716, granted August 20, 1929. Divided and this application filed January 30, 1928. Serial No. 250,420.

The present invention relates to primary batteries of the oxide of metal and zinc type, as employed in a jar in spaced relation to each other and submerged in a suitable electrolyte, as for instance, caustic soda.

The invention is a division of our application for primary battery, filed in the United States Patent Office December 21, 1926, Serial No. 156,100, and now Patent Number 1,725,716, dated August 20, 1929, relates especially to electro-chemical means for increasing the active surface portions of battery elements by the action of the battery itself, and serves to provide a battery of the desired character which is prepared for immediate function upon its installation so as to insure uniform voltage during discharge.

The battery further includes electrodes which may be suspended from the jar and cover and wherein, by reason of its novel construction, there is a tendency to reduce or diminish the initial voltage; and, to provide means so that the conductivity of the oxide of copper depolarizer will begin at a point of the element furthest from the zinc and cause the battery to have a comparatively low E. M. F. at the start and still be within the working range for the service required. The reduced oxide of copper working towards the zinc element during discharge, thereby diminishing the distance between this point and the negative element.

A battery constructed in accordance with our invention has shown very much better results during the latter part of its life, at which time practically all other batteries of the usual type and construction, show their low point of efficiency. With our improved battery, we maintain the same in a state where it is most economical in delivering its energy.

An embodiment of the invention is shown in the accompanying drawings and will be hereinafter more fully described and finally pointed out in the claims hereto appended.

Upon the accompanying two sheets of drawings, similar characters of reference will be found to denote like or corresponding parts throughout the several figures, and of which;

Fig. 1 shows a central vertical sectional view of a primary battery embodying our invention, supported within a battery jar;

Fig. 2 is a top plan view of the battery jar and a cylindrical zinc electrode supported therein;

Fig. 3 is a sectional plan taken on line 3—3 of Fig. 1;

Similar reference characters indicate corresponding parts throughout the several figures of the drawings.

Figure 4:
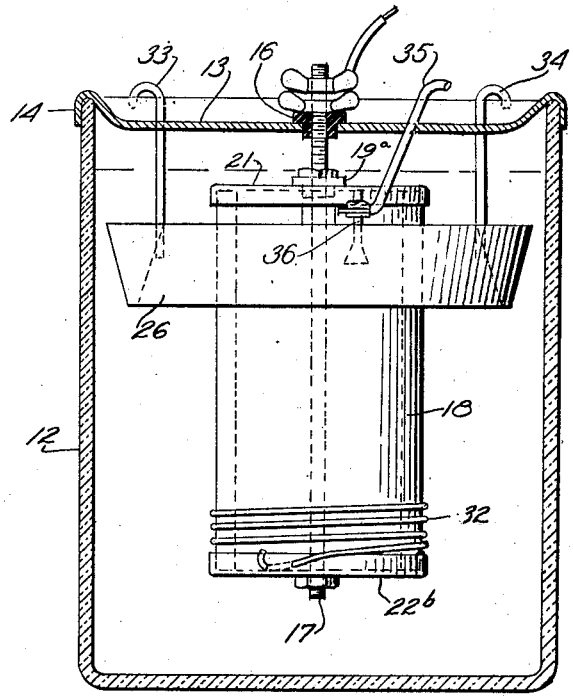
Fig. 4 is a sectional elevation of a primary battery including a jar, showing a modification of the invention.
Figure 6:
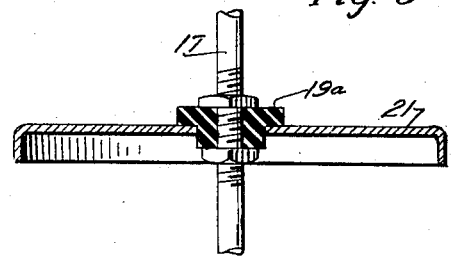
Fig. 6 shows an enlarged detail sectional view of the suspension rod, cap and means of insulatively connecting the two as employed in Fig. 4.

Referring in detail to the characters of reference marked upon the drawings, see Figs. 1, 2 and 3, 12 represents a battery jar, 13 a bridge strip having end portions 14 which are suitably bent to engage the top edge portion of the battery jar to hold the strip in position. This bridge strip as shown in Figs. 1 and 4 further includes a central hole 15 midway of its length to receive an insulative bushing 16 through which the suspending rod 17 for the negative electrode 18 is positioned for the suspension of the same within the jar. Said road being secured to the bridge strip by means of wing nuts, as shown, attached to the threaded end of the rod.

The negative electrode as shown in Fig. 1, is made up of several compressed oxide of copper cylinders A, B and C arranged one above the other and insulatively supported on the suspension rod 17 removably attached to the supporting bridge strip. These several oxide of copper cylinders are also insulated one from the other by means of insulative bushings 19 positioned both upon the rod and in central holes 20 of the top and bottom end caps 21 and 22, employed for supporting the oxide of copper cylinder 18 therebetween.

In this connection it will be noted that the bottom cap 22ª is not provided with a bushing and is thus designed to directly and electrically connect with the suspension rod 17 as will again be referred to.

A metal spider 23 may be formed integral with the caps 22 and include depending arms 24 which extend into the upper end portion of the cylindrical electrodes to engage the inner side walls thereof in a manner to form an electrical conductor from one cylinder to another. Insulative tubular bushings 25 are positioned on the rod 17 intermediate of the before mentioned bushing 19 and serve to hold the several cylinders in spaced relation to each other. By means of this construction and assemblage of parts it will be seen that the oxide of copper cylinder is first acted upon around the bottom edge of the lower cylinder A by reason of the fact that this portion only is in electrical contact with the suspension rod 17 through the medium of the cap 22ª.

The action upon this element when assembled in a battery as shown in Fig. 1, therefore, is to begin to color around the bottom edge of the lower cylindrical section A and work upward until the lower section has been reduced to metallic copper so that it then serves as a conductor to connect with the lowermost set of arms through which the adjoining lower portion of the intermediate cylinder B is brought into action for reduction in the same was as the lower unit. The third or uppermost section C of the negative element is next acted upon and consumed in substantially the same manner thereby consuming each of the several copper oxide units in their respective order.

In addition to the illustration of a top plan view of a battery jar in Fig. 2, we have also shown the annular zinc electrode 26 shown in Fig. 1, which includes a simplified means for its suspension in a jar, comprising a single wire 29, bent midway of its length to form an eye 28 for attachment to the stud 29. The outer end portions of the said wire being bent and disposed to form spaced apart hooks 30 and 31 to engage and rest upon the top edge of the battery jar in a way to support the positive element therein.

In the form of the invention shown in Fig. 4, the suspension rod is insulated from the top cap 21 by a bushing 19ª but is electrically connected to the bottom cap 22ᵇ, so that conductivity must begin at the lower part of the element 18. In this respect, it will also be noted that we have provided a few windings of zinc-coated wire 32 around the outer surface of the lower extremity of the cylindrical negative element, having one end connected to the lower cap 22ᵇ, which is for the purpose of increasing the conductivity and causing the battery to have a comparatively low E. M. F. at the start and yet be within the working range for the service required.

This construction and assemblage as shown in Fig. 4, within a caustic soda solution, will cause the negative element to color from the bottom upward and become increasingly conductive, the oxygen being used up from the bottom of the element first, so that as the battery continues in operation, the lower part of the solution will become saturated with the sodium zincate, or other inert material, the active part of the copper being in the zone of the fresh electrolyte or active electrolyte material.

Figure 5:
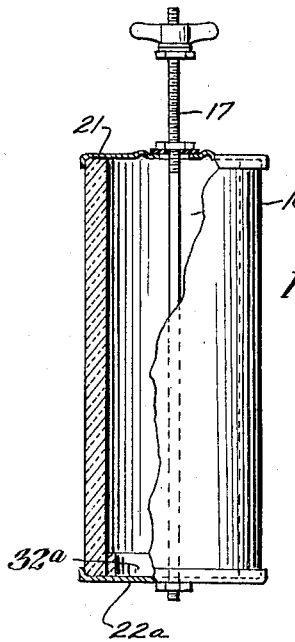
Fig. 5 is a sectional elevation of a slightly modified form of negative element embodying the features of the invention.
Figure 7:
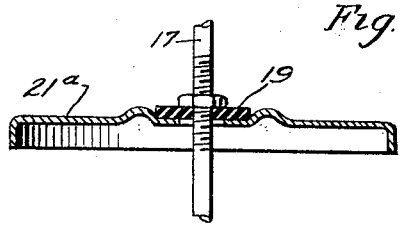
Fig. 7 is a similarly enlarged detailed sectional view showing the insulative connection between the rod and cap employed in Fig. 5.

In Fig. 5 is shown a compressed cylindrical form of copper oxide element somewhat like that shown in Fig. 4 and is provided with a zinc alloy ring 32ª against and within the lower part of the cylinder and seated upon the cap 22ª. This alloy ring obviously serves to increase the conductivity of the element in the same manner as is accomplished by the wire 32 shown in Fig. 4.

The zinc element 26 as shown in Fig. 4 is annular or ring-like in form, and in cross section, wider across its top edge than its lower edge. It is supported within the jar around and in spaced relation to the negative element by means of hooks 33 and 34, one end of which may be cast in the zinc electrode, and the other disposed upward and bent to form hook-ends which engage the top edge of the jar. The rubber-covered service wire 35 is detachably connected to a post 36 also cast within the zinc electrode at a point distant from that of the hooks 33 and 34, and when the wire 35 is bent hook-like, it together with the hooks 33 and 34 before mentioned, serve to support the zinc electrode.

Having thus described our invention, what we desire to secure by Letters Patent is:

1. A primary battery including a copper oxide element and zinc element adjacent one end of the copper oxide element and an active solution therefor, the cathode including an annular receptacle and a central conductive suspension rod, the upper portion of said rod adjacent the zinc element being insulated from said copper oxide and the lower portion being electrically connected to the copper oxide in a way to insure an initial reduction of the lower portion of the copper oxide.

2. A primary battery including a cylindrical form of copper oxide element and a cylindrical zinc element surrounding one end portion of the copper oxide element, and an active solution therefor, the negative element including a central conductive suspension rod extending substantially therethrough, one end portion of said rod being insulated from said cylinder and the other end portion of said rod farthest from the zinc being provided with a metal positive to said copper oxide to insure a quick initial reduction of a desired portion of the copper oxide.

3. A negative element for primary batteries including a cylindrical form of copper oxide and a central supporting rod therefor, metal caps carried by the rod and engaging the ends of the cylinder, means insulating one of the caps from the rod, and a highly conductive piece of metal intermediate said rod and the other of said caps to insure a quick initial reduction of the copper oxide.

4. A primary battery including a copper oxide element and a zinc element adjacent the upper end and an active solution therefor, the negative element including an annular body of copper oxide and a central conductive suspension rod, the upper end portion of said rod being insulated from said copper oxide and the lower end portion being electrically connected to the copper oxide in a manner to cause the same to be reduced from the bottom up.

5. A primary battery including a negative element and a positive element surrounding the upper portion of the negative element and an active solution therefor, said negative element including two or more cylindrical copper oxide members arranged one above the other, a suspension rod within the negative element electrically connected to the lower one of the copper oxide cylinders to be first reduced, and metallic connections from one oxide cylinder to another to continue the action to the next adjacent cylinders of the element when the first mentioned member has been reduced.

6. A primary cell having a copper oxide element and a hanger therefor, said element having two spaced end portions, a metal alloy electro-positive to copper and electrically connected to and positioned between one end portion of the element and one end portion of the hanger, and insulating means between the hanger and the other end portion of the element.

7. A primary cell having a copper oxide element and a hanger therefor, said element having two spaced end portions, a metal alloy electro-positive to copper and electrically connected to and positioned between one end portion of the element and that portion of the hanger most remote from its point of suspension, and insulating means between the hanger and the other end portion of the element.

Signed at Waterbury in the county of New Haven and State of Connecticut this 27th day of January, A. D. 1928.

MARTIN L. MARTUS.
EDMUND H. BECKER.
JAMES G. ROSS.